Jan. 10, 1967  H. W. KOHLER  3,297,948
SATELLITE SPIN MEASUREMENT
Filed June 3, 1963  2 Sheets-Sheet 1
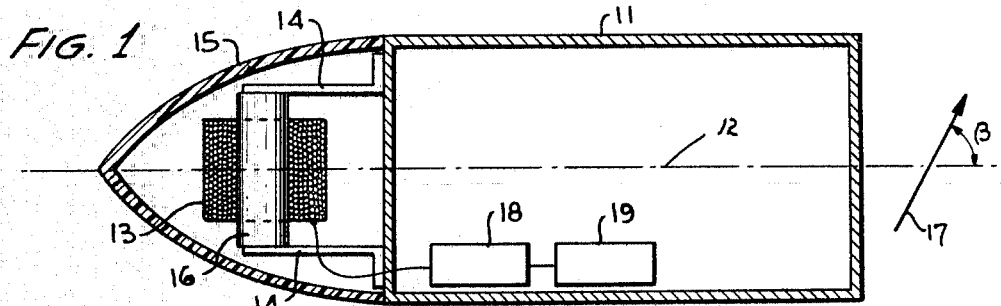
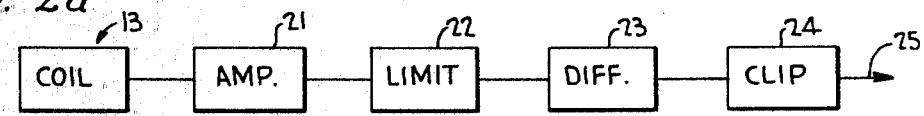
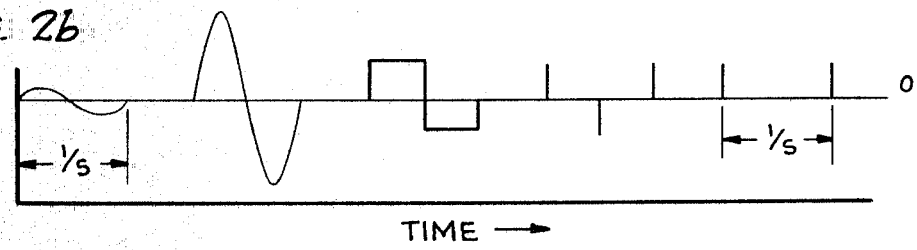
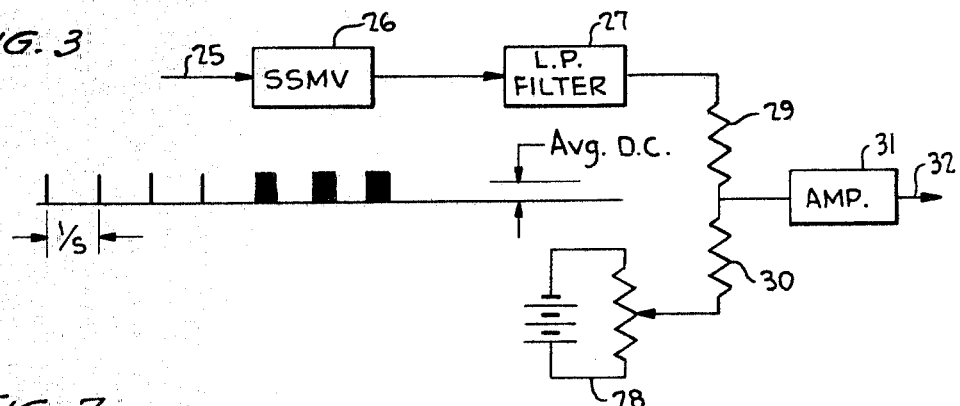
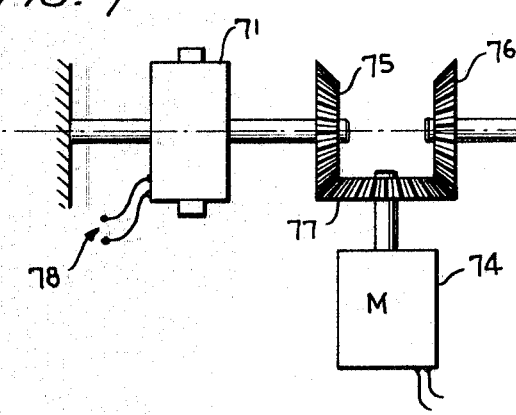
INVENTOR,
HANS W. KOHLER
BY Harry M. Saragovitz,
Edward J. Kelly,
Herbert Berl &
J. P. Edgerton
ATTORNEYS Jan. 10, 1967  H. W. KOHLER  3,297,948
SATELLITE SPIN MEASUREMENT
Filed June 3, 1963  2 Sheets-Sheet 2
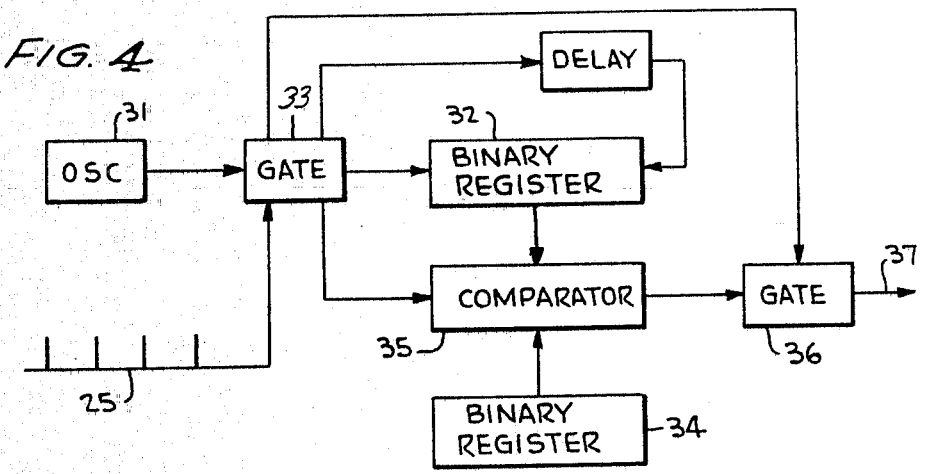
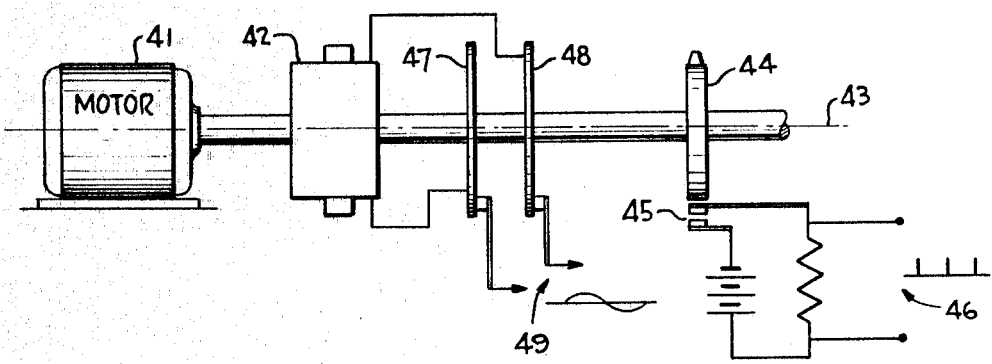
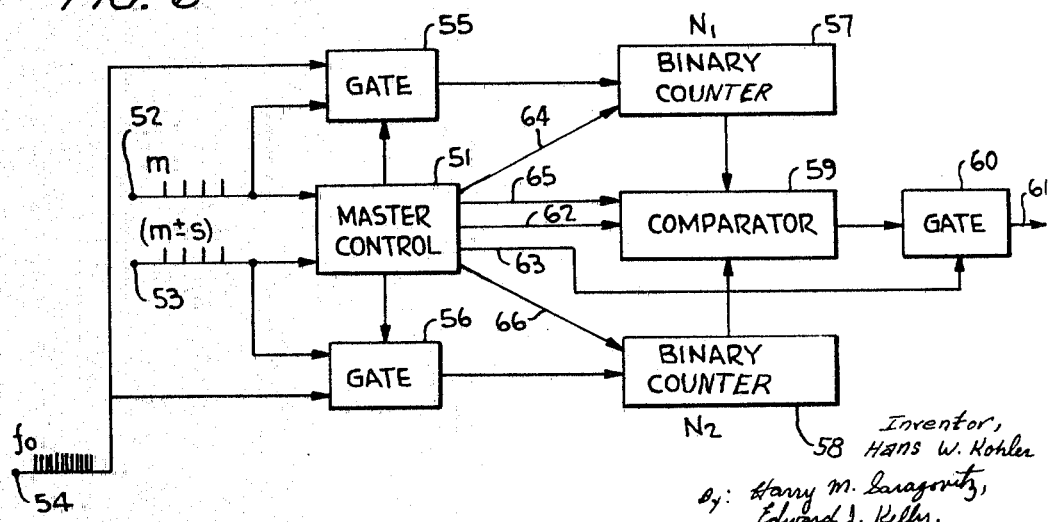
Inventor,
Hans W. Kohler
By: Harry M. Saragovitz,
Edward J. Kelly,
Herbert Berl &
J. P. Edgerton

3,297,948
SATELLITE SPIN MEASUREMENT
Hans W. Kohler, Washington, D.C., assignor to the United States of America as represented by the Secretary of the Army
Filed June 3, 1963, Ser. No. 285,154
5 Claims. (Cl. 324—70)

The invention described herein may be manufactured and used by or for the Government of the United States of America for governmental purposes without the payment to me of any royalty thereon.

This invention relates to the measurement of projectile spin, and more particularly a method and means for measuring the angular speed of spin-stabilized satellites. Many systems have been proposed in the prior art to measure the angular speed of bodies in free flight. The need and the complexity of the problem is especially acute with reference to spin-stabilized satellites. Accuracy, simplicity, reliability, and compactness are important considerations in this application. Chief among the problems encountered is that of a suitable frame of reference for a missile in free flight. Prior art solutions have used optical scanning systems which sense the earth's horizon, or other celestial bodies.

An object of this invention is to provide a novel method and means of measuring the angular speed of rotating bodies in free flight.

Another object of this invention is to provide a simple, inexpensive, accurate, method and means to measure the angular speed of rotating free flight bodies.

A further object of this invention is to provide a novel method and means to measure the angular speed of free flight rotating bodies, when the angular speed of the body is small.

Still another object of this invention is to provide means to digitally measure the angular speed of spin-stabilized satellites.

These and other objects of the present invention are accomplished by using the earth's magnetic field as a frame of reference. The earth's magnetic field may be considered invariant at a given location during time intervals long compared to that of the period of the spin. An exploring coil is mounted in the vehicle whose spin is to be measured. For each revolution of the exploring coil the average spin, corresponding to uniform speed of rotation, is measured. When the spin is large, of the order of 10 r.p.s., the exploring coil is fixed with respect to the vehicle. For low spins, the coil is motor driven around an axis parallel to or coincident with the vehicle spin axis.

In general, the use of the earth's magnetic field as a frame of reference is a well-known expedient. The magnetic compass is one example. Another example is the attempted use of the earth's magnetic field as a frame of reference for speed indicators for airplanes as shown by the patent to Poole, U.S. No. 1,422,224. Schemes such as those represented by Poole have not been generally adopted. Another attempt to use the earth's magnetic field as a frame of reference for an aircraft is represented by Anderson, U.S. Patent No. 2,114,283. Such a device is too sensitive and delicate for certain practical applications. In accordance with the teaching of the instant application no reliance is placed upon the magnitude of the signal developed by the earth's magnetic field. Applicant's device relies only on the zero crossings of the developed signal, which are susceptible to digital measurement with a high degree of accuracy.

The specific nature of the invention, as well as other objects, uses and advantages thereof, will clearly appear from the following description and from the accompanying drawings in which:

FIG. 1 illustrates one embodiment of this invention suitable for use with projectiles having high spin rates.

FIG. 2a shows, in block diagram form, one method of producing time markers from the signal developed by the exploring coil.

FIG. 2b shows the wave form developed at each stage at FIG. 2a.

FIG. 3 shows, in block diagram form, an analogue method of measuring spin.

FIG. 4 shows, in block diagram form, a method of digitally measuring spin.

FIG. 5 shows an arrangement for measuring angular speed when the spin rate is low.

FIG. 6 shows a preferred digtal method of measuring spin when the spin rate is low.

FIG. 7 shows another way to measure low spin rates.

Referring to FIG. 1, there is shown, pictorially, a device for measuring the angular speed of a spinning satellite or missile embodying the teachings of this invention. The scheme shown in FIG. 1 is suitable for use with missiles which have a large angular speed, that is, on the order of 10 revolutions per second or greater. Missile 11 has a spin axis 12 about which it rotates. Wound on a core 16 of high permeability material such as ferrite is an exploring coil 13 made up of a large number of turns of conducting wire. The exploring coil 13 and its core 16 are fixed within the projectile 11 by arms 14 so that the coil and the projectile spin as a single unit. The exploring coil is located within a non-magnetic and non-conducting enclosure 15 to prevent its being shielded from the earth's magnetic field. The exploring coil 13 encompasses a varying amount of the earth's magnetic flux, the direction of which is represented by the vector 17, as the projectile spins about its axis 12.

With an assumed direction of earth's magnetic field H, represented by the vector 17 of FIG. 1, which makes an angle $\beta$ with the spin axis, the voltage induced in a coil rotating in the earth's magnetic field is $$E_{\text{volts r.p.m.s.}} = \sqrt{2}\pi N A \mu H s \sin \beta \times 10^{-8}$$

where $N$=number of turns of the exploring coil
$A$=average effective area of the loops, cm.$^2$
$H$=earth's magnetic field, oersted
$\mu=B/H$ permeabilty of the coil core
$s$=rotational speed of the coil, r.p.s.
$\beta$=angle between spin axis and earth's field H.

The output voltage of the exploring coil 13 will be approximately sinusoidal with a frequency equal to $s$, the rotational speed of the projectile. This is true as long as the angle $\beta$ is not zero degrees, since if $\beta$ were zero degrees, the coil 13 would not encompass varying amounts of the earth's flux as the projectile 11 spins on its axis. As can also be seen from an inspection of Equation 1, the cross-sectional area of the coil 13 should be as large as possible, and the permeability of the core should also be made as large as practical. The exact wave shape and amplitude of the induced voltage wave is immaterial as long as its zero crossings permit generation of time markers. To generate the time markers, as will be explained in more detail in connection with FIG. 2, the periodic wave developed in the exploring coil is amplified, limited, differentiated, and the spikes of one polarity suppressed, in a device 18. The interval between the time markers of the one polarity is then measured by a device 19.

Referring to FIGS. 2a and 2b, the sinusoidal voltage signal developed in the exploring coil 13, having a frequency of $s$ c.p.s., where $s$ is the spin rate, is amplified in an amplifier 21. The large signal output of amplifier 21 is then limited in a limiter circuit 22 producing essentially a square wave output. The square wave output has both positive and negative values, with the steep edge of the wave form at the zero crossings of the sinusoidal input. The square wave output from limiter 22 is differentiated in a differentiating circuit 23 producing a series of alternate positive and negative spikes at each zero crossing of the square wave output of limiter 22. The negative spikes are then eliminated in a clipper circuit 24, leaving a series of positive time markers spaced $1/s$ seconds apart. The interval between markers appearing at 25 may then be measured by any of a number of well known means. One analogue and one digital method of measuring the spacing between the markers is shown in FIGS. 3 and 4, respectively.

FIG. 3 shows an analog method of measuring the spacing between the time markers appearing at output 25 of FIG. 2a. The time markers, having a frequency of $s$, are fed into a single shot multivibrator 26, which produces a constant standardized output pulse for every time marker input pulse. The output of single shot multivibrator 26 is fed through a low pass filter 27 where the pulses are smoothed, giving an average D.C. level depending upon the repetition rate of the input pulses. If desired, the output of low pass filter 27 may be measured directly, the magnitude of D.C. voltage being proportional to the angular speed of the projectile. Alternatively, as shown, the output of low pass filter 27 may be balanced against a voltage 28, which is set to a value corresponding to a desired spin rate. Any unbalanced voltage developed in the resistor network 29 and 30 may be amplified in amplifier 31, and the output 32 applied to the spin control. If desired, the D.C. voltage from the filter 27 can be used to disconnect the input 32, to the spin control by means of a relay that opens when the D.C. voltage is very low. This low voltage, at the output of filter 27, may result either because the magnetic field and spin axis are nearly parallel, or because of equipment failure.

If a higher precision of spin frequency measurement is desired, spacing between time markers can be measured digitally, as shown in FIG. 4. Here a frequency controlled oscillator 31 produces calibration pulses at a high rate, for example, 100,000 pulses per second. These pulses enter a binary register 32 through a gate 33 that is opened and closed by successive time markers appearing at output 25 of FIG. 2a. A binary register 34 is preset according to the constant spin desired. For example, the register is preset to 10,000 for a desired spin rate of 10 revolutions per second and a calibration pulse rate of $10^5$. In a comparator 35 the content of binary register 32 is subtracted from that of binary register 34 resulting in a positive or negative binary number or zero indicating the deviation from the desired spin as sensed by exploring coil 13.

In operation, when gate 33 closes in response to a timing marker preventing the output of oscillator 31 from reaching binary counter 32, a gate 36 opens and passes the reading contained in comparator 35 to the output. The closing of gate 33 also generates a delayed clearing pulse for binary register 32. The binary output appearing at 37 can be converted to analogue form for spin control and measurement, if desired.

If the spin frequency is low, the motor-driven sensing coil embodiment shown in FIG. 5 is used. In this embodiment a motor 41 drives an exploring coil 42 which is similar to coil 13 of FIG. 1. The coil 42 is driven at a constant speed relative to the vehicle about an axis collinear or parallel to the spin axis 43 of the vehicle. Here two sets of time markers are generated. The first set of markers is derived from the rotation of coil 42 relative to the vehicle and are $1/m$ seconds apart. A second set of markers indicates rotation of the coil 42 relative to the earth, and $1/(m\pm s)$ seconds apart. The fixed frequency time markers $m$ are generated by a cam-like disc 44 which closes the contact 45 once each revolution. The resulting current pulses at 46 are processed to furnish marker pips $1/m$ seconds apart. Obviously, instead of using a mechanical contact, a current or voltage pulse may be generated by fastening a small permanent magnet on a disc that passes a pick up coil, or attaching to the disc one plate of a small capacitor that once per revolution passes under its mate.

The exploring coil 42 is connected to a pair of slip rings 47 and 48. When the coil is rotating in the earth's magnetic field it will generate a sine wave output having a frequency $(m\pm s)$, where $m$ is the motor speed and $s$ is the vehicle spin speed. This output appearing at 49 is then processed in a circuit similar to FIG. 2a, to produce a series of marker pips spaced $1/(m\pm s)$ seconds apart. The plus sign holds when the motor and vehicle spins have the same sense of rotation, and the minus sign when sense of rotation is opposite.

Spin information is extracted from the timing markers of FIG. 5 by measuring their spacing. In an analogue method two channels of pulses would be generated at the rate of $m$ and $(m\pm s)$ per second, as shown for one channel in FIG. 3.

A more accurate and preferred method is the digital method, which uses calibration pulses of frequency $F_o$ as shown in FIG. 6. Markers having a spacing $m$, derived from output 46, are applied to a master control 51 over lead 52. The second set of timing markers $(m\pm s)$, derived from output 49, are also applied to the master control 51 over a second lead 53. Clock pulses, having a frequency $F_o$, are applied to gates 55 and 56 by means of lead 54. A first timing marker applied to lead 52 opens gate 55, and a first timing marker applied to lead 53 opens gate 56. With these gates 55 and 56 open, the clock pulses of frequency $F_o$ are registered in binary counters 57 and 58. The next timing marker applied to lead 52 closes gate 55, and the next timing marker applied to lead 53 closes gate 56. The number of clock pulses $N_1$ and $N_2$ of frequency $F_o$ appearing during the interval between the timing markers at frequency $m$ and $(m\pm s)$ respectively, are stored in binary counters 57 and 58 respectively. The counts thus stored are subtracted in a comparator 59 and the result is fed through an output gate 60 to an output terminal 61. With the scheme shown in FIG. 6 measurements of the spin rate $s$ are made, at most, every other period $1/m$.

The functions of gating subtraction and clearing are controlled by master control 51. After the gates 55 and 56 have closed, and count has been stored in binary registers 57 and 58, a pulse on line 65 causes comparator 59 to subtract the outputs of binary registers 57 and 58. Another pulse on line 63 opens gate 60 to allow the results of comparator 59 to be read out. A third pulse on lines 62, 64 and 66 clears and resets binary counters 57, 58, and compartor 59.

The spin frequency $s$ is found as follows:

$$m = 1/T_1 = F_o/N_1 = 1/T_oN_1$$

and $$(m+s) = 1/T_2 = F_o/N_2 = 1/T_oN_2$$

where $N_1$ and $N_2$ are the counts in the registers 57 and 58. Then, $$s = F_o(1/N_2 - 1/N_1) = F_o\left(\frac{N_1-N_2}{N_1N_2}\right)$$

$s$ is positive (i.e., in the same direction as the motor) if $N_1 > N_2$.

An alternate scheme, similar to that shown and described in connection with FIGS. 5 and 6, makes use of two exploring coils rotating in opposite directions around parallel axes at the same speed $(m)$ relative to the vehicle. Such an arrangement is illustrated in FIG. 7.

The two exploring coils 71 and 72 are mounted to rotate about an axis 73 parallel to the spin axis or collinear with it, when driven by motor 74. Motor 74 drives the coils 71 and 72 in opposite directions by means of gears 75, 76, and 77. A pair of slip rings, not shown, similar to those of FIG. 5, are provided for each coil having outputs 78 and 79.

As the vehicle spins at a frequency $s$ around the spin axis 73, coil 71 developes a sinusoidal signal of frequency $(m+s)$, and coil 72 developes a sinusoidal frequency of $(m-s)$, where $m$ is the frequency of rotation due to motor 74. Timing makers are derived from the signals by applying the outputs appearing at 78 and 79 to a circuit similar to that shown in FIG. 2a. These timing markers, having spacings of $1/(m+s)$ and $1/(m-s)$ respectively are then applied at leads 52 and 53 of FIG. 6. The resultant output may be derived as follows:

$$m+s=1/T_1=F_0/N_1$$

and $$m-s=1/T_2=F_0/N_2$$

from which $$s=\frac{F_0}{2}(1/N_1-1/N_2)=\frac{F_0}{2}\left(\frac{N_2-N_1}{N_1 N_2}\right)$$

One advantage, besides accuracy, of measuring spin digitally is that it is easy to subtract successive spin data and obtain results proportional to angular acceleration, that is:

$$\dot{\omega}=2\pi\frac{\Delta s}{\Delta t}$$

where $\dot{\omega}$ is the angular acceleration.

It will be apparent that the embodiments shown are only exemplary and that various modifications can be made in the construction and arrangement within the scope of the invention as defined in the appended claims.

I claim as my invention:

1. A system for measuring the rate of rotation of a body adapted to rotate while in free flight within the earth's magnetic field, said system comprising:
   (a) said body,
   (b) an exploring coil encompassing a fixed area mounted within said body, the orientation of said coil relative to the axis of rotation of said body being such that the amount of the earth's magnetic field in said fixed area varies as said body rotates, thereby generating an alternating-current signal in said coil,
   (c) sensing means to sense the signal generated in said exploring coil,
   (d) timing marker means connected to said sensing means to develop a timing marker signal each time said alternating current signal passes through zero, and
   (e) measuring means connected to said timing marker means to measure the time interval between said timing marker signals.

2. A system for measuring the rate of rotation of a body adapted to rotate while in free flight the earth's magnetic field, said system comprising:
   (a) said body,
   (b) an exploring coil encompassing a fixed area mounted within said body, the orientation of said coil relative to the axis of rotation of said body being such that the amount of the earth's magnetic field is said fixed area varies as said body rotates, thereby generating an alternating current signal in said coil,
   (c) amplifier means having an input and an output, said input connected to said coil to receive said signal,
   (d) timing marker means for producing a timing marker signal each time said alternating current signal passes through zero, the input of said timing marker means being connected to said output of said amplifier means, said timing marker means including differentiating means, and
   (e) measurement means connected to the output of said timing marker means to measuring spacing between said timing markers.

3. The invention according to claim 2 wherein said measurement means is of a digital type.

4. A system for measuring the rate of rotation of body adapted to rotate while in free flight within the earth's magnetic field, said system comprising:
   (a) said body,
   (b) an exploring coil encompassing a fixed area mounted within the body, with said coil mounted along the body spin axis so that the amount of earth's magnetic field in said fixed area varies as said body spins, producing an alternating current signal,
   (c) motor means to rotate said coil about said body spin axis at a constant rate with respect to said body,
   (d) sensing means sensing to sense the signal generated in said coil,
   (e) timing marker means, including differentiating means, connected to said sensing means to generate a timing marker each time said alternating current signal passes through zero,
   (f) motor signal means to generate a motor signal for each revolution of said motor, and
   (g) comparison means connected to receive said timing marker and said motor signal to digitally compare the repetition rates of said timing marker and said motor signal, thereby providing a measure of the body spin rate.

5. A system for measuring the rate of rotation of a body adapted to rotate while in free flight with the earth's magnetic field, said system comprising:
   (a) said body,
   (b) first and second exploring coils encompassing a fixed area mounted within the body, with said exploring coils mounted along the body spin axis so that the amount of the earth's magnetic field in said fixed areas varies as said body spins, producing an alternating current signal in each of said coils,
   (c) motor means to rotate said exploring coils at a constant rate, but in opposite directions, about the body spin axis,
   (d) means to sense the signal generated in each of said exploring coils and means connected to said signal sensing means to generate a timing marker for each of said exploring coils when the signal developed in the coils passes through zero, and
   (e) means connected to receive said timing markers for comparing the repetition rates of the timing markers resulting from the signal in each of said coils, thereby providing a measure of the body spin rate.

References Cited by the Examiner

UNITED STATES PATENTS 2,514,349  7/1950  Allison _____ 324—43

OTHER REFERENCES

"Speed Indicator Has Expanded Scale," Electronics, May 1, 1957.

WALTER L. CARLSON, *Primary Examiner.*

M. J. LYNCH, *Assistant Examiner.*